US007930640B2

(12) United States Patent
Dong et al.

(10) Patent No.: US 7,930,640 B2
(45) Date of Patent: Apr. 19, 2011

(54) METHODS FOR SPLITTING AND MERGING CALENDAR ENTRIES

(75) Inventors: Weichuan Dong, Lowell, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 11/831,527

(22) Filed: Jul. 31, 2007

(65) Prior Publication Data

US 2009/0037843 A1 Feb. 5, 2009

(51) Int. Cl.
*G06F 3/00* (2006.01)

(52) U.S. Cl. ............ 715/764; 715/810; 715/963; 705/8

(58) Field of Classification Search .................. 715/764, 715/810, 963; 705/8, 9
See application file for complete search history.

(56) References Cited

U.S. PATENT DOCUMENTS

| | | | | |
|---|---|---|---|---|
| 4,445,795 | A * | 5/1984 | Levine et al. | 400/63 |
| 4,896,148 | A * | 1/1990 | Kurita | 345/670 |
| 5,261,045 | A * | 11/1993 | Scully et al. | 715/751 |
| 7,039,596 | B1 | 5/2006 | Lu | |
| 7,181,689 | B2 | 2/2007 | Mock et al. | |
| 7,340,484 | B2 * | 3/2008 | S et al. | 1/1 |
| 7,679,518 | B1 * | 3/2010 | Pabla et al. | 340/573.1 |
| 2002/0131565 | A1 * | 9/2002 | Scheuring et al. | 379/88.19 |
| 2003/0129569 | A1 | 7/2003 | Callaway et al. | |
| 2004/0109025 | A1 * | 6/2004 | Hullot et al. | 345/764 |
| 2006/0287905 | A1 | 12/2006 | Stoner | |
| 2007/0250366 | A1 * | 10/2007 | Nurmi | 705/8 |
| 2007/0288292 | A1 * | 12/2007 | Gauger | 705/9 |
| 2008/0294482 | A1 * | 11/2008 | Bank et al. | 705/8 |
| 2009/0006161 | A1 * | 1/2009 | Chen et al. | 705/8 |

OTHER PUBLICATIONS http://farsite.hill.af.mil/forums/help/en/calendar/c-merge.html; on and before Jul. 31, 2007.
http://www.uas.arizona.edu:8086/tutinc.htm; on and before Jul. 31, 2007.
http://www.tendenci.com/encms/?628; on and before Jul. 31, 2007.

* cited by examiner

*Primary Examiner* — Weilun Lo
*Assistant Examiner* — Phenuel S Salomon
(74) *Attorney, Agent, or Firm* — Cantor Colburn LLP; Ayla Lari

(57) ABSTRACT

A method of merging and splitting calendar entries is provided. The method of merging includes initiating a Personal Information Management (PIM) that is configured to manage a calendar, opening the calendar, selecting a first calendar entry and a second calendar entry, and selecting an owner action selection of the PIM. The owner action selection includes a merge and split selection. Selecting the merge selection combines information of the first calendar entry with information of the second calendar entry, such that a new calendar entry is created that includes the combined information of both the first and second calendar entries. A time and/or place is entered for the new calendar entry having the combined information. Additionally, selecting a split selection initiates a first and second pane where the second pane includes two subsections with original calendar entry information that may be amended and saved as two new calendar entries.

3 Claims, 4 Drawing Sheets

*FIG. 1*

165 — Save and Send Invitations   Show Options ▼   Delivery Options...   ☑ Owner Actions ▼   Check Calendar...   ◯▼

Calendar Entry
Type:   Meeting

☐ Return receipt   ☐ Mark Private
☐ Sign           ☐ Notify Me
☐ Encrypt        ☐ Mark Available Origins:                                   New:

130

| Subject: | Dev & Test Weekly Team Meeting | Subject: | Dev Weekly Team Meeting | 140 |

When:  Starts:  Mon 11/06/2006   09:00 AM  Local time
       Ends:    Mon 11/06/2006   1 hour
                10:00 AM  Local time
       Repeat:  This entry repeats
                ⊟ View Dates
                10/13/2006, 10/20/2006, 10/27/2006,
                11/03/2006, 11/17/2006, 11/24/2006,
                12/01/2006, 12/15/2006
Who:   ☐ Do not receive responses from invitees
       Required:  Dev Team, Test Team
       Optional:  175
       FYI:
Where: Location:

When:  Starts:  Mon 11/06/2006   01:00 PM  Local time
       Ends:    Mon 11/06/2006   1 hour
                02:00 PM  Local time
       Repeat:  This entry repeats weekly every Monday
                for 5 weeks    Cancel Repeat
Who:   ☐ Do not receive responses from invitees
       Required:  Dev Team                    — 170
       Optional:
       FYI:
Where: Location:

— 150

| Subject: | Test Team Weekly Meeting | — 155 |

More Meetings +   — 160

*FIG. 2*

METHODS FOR SPLITTING AND MERGING CALENDAR ENTRIES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to managing calendar events, and particularly to splitting and merging calendar events.

In the course of normal business, teams are often reorganized without much of a prior notice. Therefore, managers are forced to juggle their established schedule of meetings to meet the new demands.

This task, however, is not straightforward when using existing calendar and scheduling tools. Available tools currently require managers to toy with the participant list in one meeting and cancel/create another meeting, or just cancel all the original meeting(s) and start from scratch creating the meeting. Simple changes in structure may take some time, while more complex changes (for example, merging of three or more teams) would entail complex, repetitive operations.

It would be beneficial to have helpful tools and methods for addressing changing events and schedules, and reorganizations.

SUMMARY

In accordance with an exemplary embodiment, a method of merging calendar entries is provided. The method includes initiating a Personal Information Management (PIM) that is configured to manage a calendar, opening the calendar, selecting a first calendar entry and a second calendar entry, and selecting an owner action selection of the PIM. The owner action selection includes a menu having a merge selection. Also, the method includes selecting the merge selection which combines information of the first calendar entry with information of the second calendar entry, such that a new calendar entry is created that includes the combined information of both the first and second calendar entries. A time and/or place is entered for the new calendar entry having the combined information.

In accordance with the exemplary embodiment, a method of splitting a calendar entry is provided. The method includes initiating a Personal Information Management (PIM) that is configured to manage a calendar, opening the calendar, selecting an original calendar entry, and selecting an owner action selection of the PIM. The owner action selection includes a menu having a split selection. The method includes selecting the split selection, which initiates a first and second pane. Also, information of the first pane includes information of the original calendar entry, and the second pane includes a first and a second subsection, where information of the first and the second subsection includes information of the original calendar entry. Further, the information of the first and the second subsection can be respectively amended, such that the information of the first subsection is a new calendar entry and the information of the second subsection is another new calendar entry.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates a method of splitting calendar events, in accordance with an exemplary embodiment;

FIG. 2 continues illustration of the method of splitting calendar events, in accordance with the exemplary embodiment;

Figure 3:
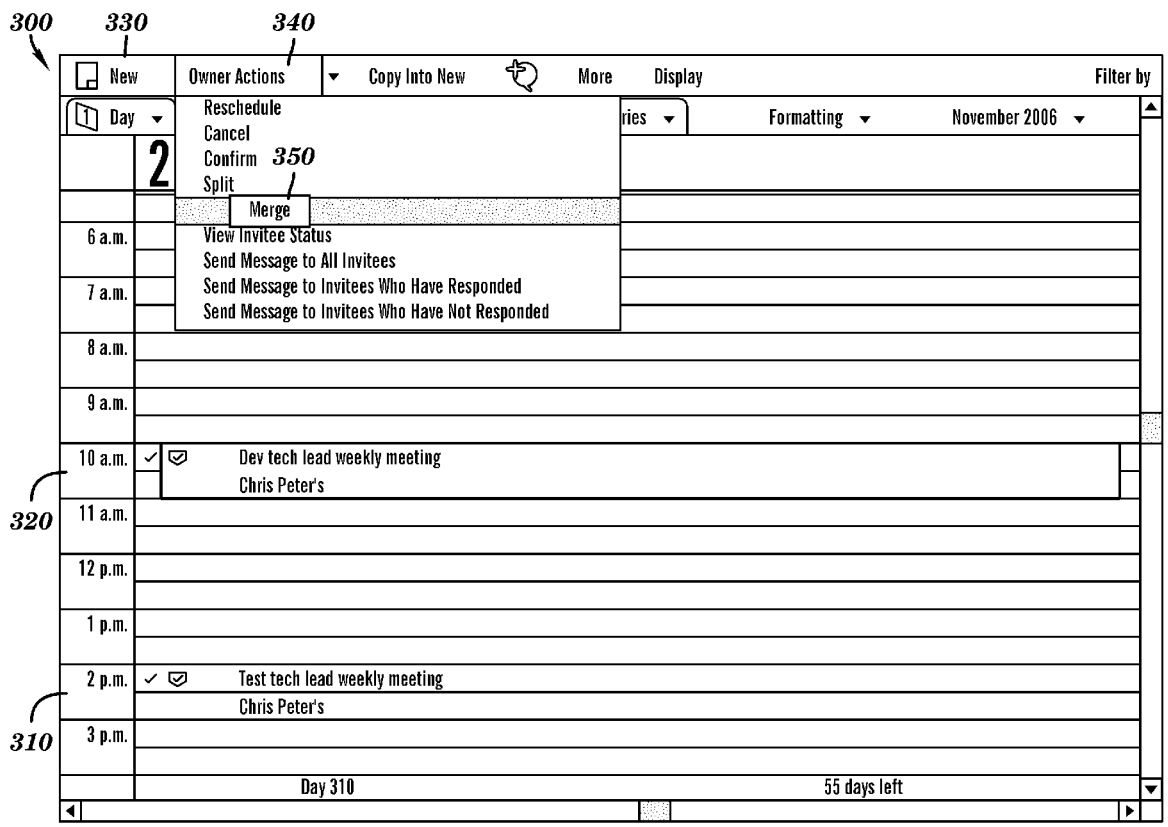
FIG. 3 illustrates a method of merging calendar events, in accordance with the exemplary embodiment.

The detailed description explains the exemplary embodiment of the invention, together with advantages and features, by way of example with reference to the drawings.

DETAILED DESCRIPTION OF THE EXEMPLARY EMBODIMENT

For various reasons, managers may be forced to juggle their established schedule of meetings, by merging meetings that were previously supposed to be held separately but that should now be held together to reflect the new team structure, or by splitting a meeting for the opposite reason.

An exemplary embodiment is described herein as a tool for merging and splitting multiple calendar events. Using the merging and splitting tool allows the data of calendar events to be merged or split as desired. As non-limiting examples, the subject, time, invitees, location, chair of the event, etc., may be split or merged with the merging and splitting tool. In accordance with exemplary embodiments, the merging and splitting tool may be implemented in a device having a processor, memory, display, and/or network capabilities, such that multiple calendar events may be merged or split as discussed herein.

For illustrative purposes only, two non-limiting scenarios are provided below to exemplify operations of the merging and splitting tool for multiple calendar events. In the first scenario, a manager called Eric, who manages a software development and testing team, receives news that due to corporate growth, Eric will only manage the software development team, and Jen will manage the software testing team. Therefore, the software development and testing team needs to be split.

Eric normally holds a weekly meeting for the whole software development and testing team, which has been scheduled in advance for the whole year in his Personal Information Management (PIM). A PIM is a type of application software that functions as a personal organizer. For the sake of efficiency, Jen and Eric decide that the software development and testing teams should have their own weekly meetings, but that next month's meeting should be held as planned to ensure a smooth transition.

Figure 1:
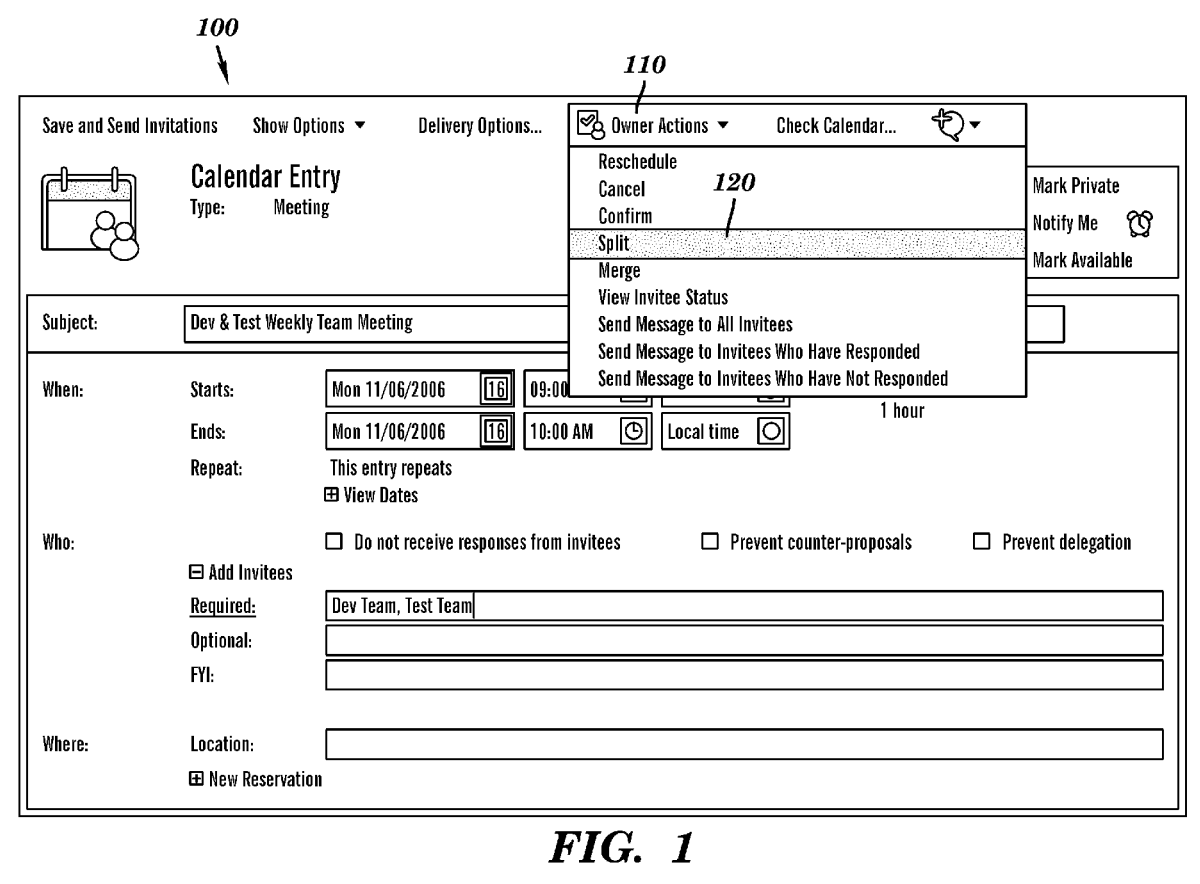

In accordance with an exemplary embodiment for splitting and merging calendar entries, Eric opens the existing software development and testing weekly team meeting in his calendar 100, depicted in FIG. 1. In the process of splitting the software development and testing team meeting into two new separate meetings, Eric clicks on the owner actions 110 menu in calendar 100 and then selects a split 120 menu item.

In FIG. 2, the calendar 100 form gets refreshed, and there are two new panes 130, 140 appearing in the calendar 100 form. The left pane 130 displays the original meeting time and invitee list 175 (e.g., Dev Team, Test Team). The right pane 140 displays two subsections 150, 155 that are used to set up the new separate meetings. By default, both of the two new subsections 150, 155 keep the same meeting time, location, and invitees from the original meeting invitation. Although FIG. 2 only illustrates a subject line (e.g., Test Team Weekly Meeting) for the subsection 155, the subsection 155 includes the same information (from the original meeting invitation, which is not shown) as depicted in the subsection 150. As a non-limiting example, Eric removes the software development team from the invitee list 170, and only the software development team remains (e.g., Dev Team) in the invitees 170.

Continuing the first scenario, Eric now has to change at least the meeting time or location for one of the split team meetings (software development team and/or the software testing team), but Eric can also change any other information at that time, and assign ownership of the new (scheduled) meeting for the new software testing team to Jen. Once Jen is the owner of the new meeting for the software testing team, Jen may make additional changes.

Further, in accordance with the exemplary embodiment, if need be, Eric can also click on the more meetings "+" button 160 at the bottom of the right pane 140. The more meetings "+" button 160 allows Eric to split the meeting even further. As non-limiting examples, meetings for the software development team and the software testing team may be split into further scheduled meeting (e.g., a third, fourth, etc. meeting). Also, in accordance with the exemplary embodiment, in the case of repeated events, Eric can decide when the split will occur (in the example case, after the next month's meeting).

On the right pane 140, Eric keeps the same meeting date and location for his software development team meeting in the subsection 150, but deletes the software testing team members from the invitee list 170. Eric fills out the new meeting time, location, and invitee list (which does not show the breakout as in subsection 150) for the software testing team in the subsection 155 (which does not show the breakout as in subsection 150). Eric may choose to view the breakout for subsections 150, 155 at the same time, or may choose one to view one at a time. Eric clicks on a save and send invitations button 165. Eric's software development team will receive an updated meeting notice from him, and the software testing team will receive a new meeting invitation. Accordingly, Eric has successfully split the single software development and testing team meeting into a distinct software development team meeting and software testing team meeting.

In the second scenario, Chris feels it is important to have the software testing team tech leads and the software development team tech leads meet for a face-to-face round table meeting on a weekly basis, so issues can be better communicated. Chris was previously holding these weekly meetings separately for the software testing tech leads and software development tech leads. In accordance with the exemplary embodiment for splitting and merging calendar entries, Chris opens his calendar 300 and selects both the software testing tech lead meeting 310 and the software development tech lead meeting 320 in FIG. 3. Eric then accesses the tool bar 330 menu, clicks on the owner actions 340 menu, and then selects a merge 350 menu item.

Figure 4:
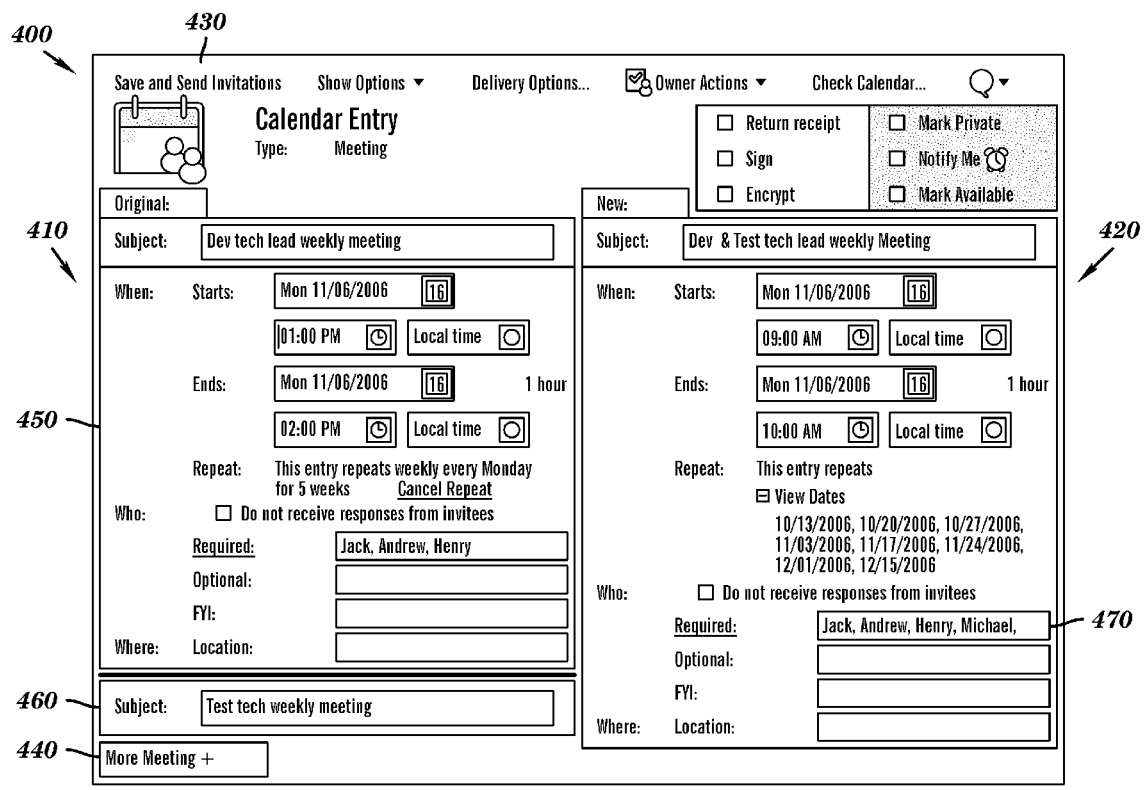
FIG. 4 continues illustration of the method of merging calendar events, in accordance with the exemplary embodiment.

In accordance with the exemplary embodiment, a dialog box 400 pops up in FIG. 4. A left pane 410 depicts the information of the original two meetings. The left pane 410 illustrates the full information for the software development tech lead meeting 450 but only illustrates the subject line for the software testing tech lead meeting 460 (e.g., test tech lead weekly meeting). The right pane 420 illustrates new meeting information. The invitees list 470 is already filled out for the new meeting in the right pane 420. Chris selects a meeting time and place for the new meeting in the right pane 420, and then clicks on the save and send button 430 of the dialog box 400. Both groups of tech leads (e.g., the software testing tech leads and the software development tech leads) will receive update meeting notices from Chris. Accordingly, Chris has successfully merged the meetings for the software testing team tech leads and the software development team tech leads, in accordance with the exemplary embodiment.

In accordance with the exemplary embodiment, Eric may click on the more meetings "+" button 440 if additional meetings are to be merged. Accordingly, Eric may select additional meetings so that the information of the additional meetings may be added to the new meeting information in the right pane 420.

Further, it is understood that the exemplary embodiment discussed herein allows one entry to be split into multiple entries (e.g., two or more entries). As well, the exemplary embodiment allows multiple entries (e.g., two or more entries) to be merged into one entry. Although for explanatory purposes, non-limiting examples may have been described using illustrations of two entries. It is understood, however, that the exemplary embodiment is not meant to be limited to two entries but applies to merging multiple entries into one entry and splitting one entry into multiple entries.

In accordance with the exemplary embodiment, the calendar event splitter and merger tools are calendar application tools, which help in this day and age where organizations are constantly transforming their internal structure to adapt to ever changing market requirements. In accordance with the exemplary embodiment, changes in the organization can be managed more quickly and efficiently, helping to keep organizations of all sizes nimble and agile. Further, the non-limiting examples disclosed herein are not limited to calendar meetings but can be applied to other types of calendar events. Indeed, the two scenarios for merging and splitting events discussed herein are for explanation purposes and are not meant to be limiting in any way.

As understood by one skilled in the art, a computer application may be used to implement the methods discussed above in accordance with the exemplary embodiment. The computer application may be executed on a computer having a processor for executing instructions. The computer may be operatively connected to a network (e.g., the Internet) having all of the necessary entities to function and operate as a network.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of splitting a single calendar entry into multiple calendar entries, comprising:
   initiating a Personal Information Management (PIM) that is configured to manage a calendar;
   opening the calendar;
   selecting an original calendar entry comprising a same meeting time, a same location, and a same invitees;
   selecting an owner action selection of the PIM, the owner action selection comprising a menu having a split selection;
   selecting the split selection which initiates display of a first and second pane,
   wherein information of the first pane comprises information of the original calendar entry;
   displaying the first pane comprising meeting time, the same location, and the same invitees;
   wherein the second pane comprises a first and a second subsection;
   wherein the first and the second subsection comprises information of the original calendar entry;
   displaying the first subsection comprising the same meeting time, the same location, and the same invitees; and
   displaying the second subsection comprising the same meeting time, the same location, and the same invitees;
   wherein the information of the first and the second subsection can be respectively amended, such that the information of the first subsection is a new calendar entry and the information of the second subsection is an other new calendar entry.

2. The method of claim 1, wherein the original calendar entry is an original scheduled meeting, the new calendar entry is a new scheduled meeting, and the other new calendar entry is an other new scheduled meeting that is different from the new scheduled meeting, and
   wherein the method of splitting the single calendar entry into multiple calendar entries is executed on a computer.

3. The method of claim 1, wherein the information of the first and the second subsection comprises at least one of meeting time, meeting location, date, and invitees.

* * * * *